United States Patent
Ezaki

[19]

[11] Patent Number: 6,134,436
[45] Date of Patent: Oct. 17, 2000

[54] MOBILE COMMUNICATION SYSTEM WITH MOBILE TERMINAL EQUIPMENT INCLUDING BOTH PHS AND PAGER SUBSYSTEMS

[75] Inventor: Kazuhiko Ezaki, Shizuoka, Japan

[73] Assignee: NEC Corporation, Tokyo, Japan

[21] Appl. No.: 09/034,842

[22] Filed: Mar. 4, 1998

[30] Foreign Application Priority Data

Mar. 6, 1997 [JP] Japan .................................... 9-052034

[51] Int. Cl.[7] .................................................. H04Q 7/20
[52] U.S. Cl. ...................... 455/426; 455/567; 455/31.2
[58] Field of Search .................................. 455/31.2, 31.3, 455/422, 426, 434, 465, 458, 567, 552, 566; 340/825.44

[56] References Cited

U.S. PATENT DOCUMENTS

| | | | |
|---|---|---|---|
| 4,748,655 | 5/1988 | Thrower et al. ......................... | 455/461 |
| 5,117,449 | 5/1992 | Metroka et al. ..................... | 455/31.2 X |
| 5,175,758 | 12/1992 | Levanto et al. ...................... | 455/426 X |
| 5,355,126 | 10/1994 | Nelson et al. ...................... | 340/825.44 |
| 5,491,739 | 2/1996 | Wadin et al. ........................ | 455/465 X |
| 5,541,976 | 7/1996 | Ghisler ................................. | 455/552 X |
| 5,574,771 | 11/1996 | Driessen et al. ..................... | 455/426 X |
| 5,752,163 | 5/1998 | Robinson ................................ | 455/31.3 |
| 5,818,918 | 10/1998 | Fujii ........................................ | 379/167 |
| 5,832,386 | 11/1998 | Nojima et al. .......................... | 455/465 |
| 5,887,260 | 3/1999 | Nakata ..................................... | 455/436 |
| 6,009,309 | 12/1999 | Okada et al. ........................... | 455/31.3 |

FOREIGN PATENT DOCUMENTS

| | | |
|---|---|---|
| 3-32236 | 2/1991 | Japan . |
| 5-211679 | 8/1993 | Japan . |
| 8-331649 | 12/1996 | Japan . |
| 8-319972 | 6/1998 | Japan . |

*Primary Examiner*—William G. Trost
*Attorney, Agent, or Firm*—Scully, Scott, Murphy & Presser

[57] ABSTRACT

A mobile communication system includes a mobile terminal serving as a mobile terminal equipment. The mobile terminal has a pager electric field level monitor section, a PHS field level monitor section and a controller. The pager field level monitor section is for judging whether a pager receiver is within a service area of a pager base station or not. The PHS field level monitor section is for judging whether a PHS receiver is within a service area of a PHS base station or not. The controller is to control pager calling or PHS callings by the pager base station or the PHS base station according to the monitored results by the PHS field level monitor section and the pager field level monitor section. Owing to such arrangements, it is possible to improve the reception performance and the communication reliability of the mobile terminal as a pager, and thus construct an economical mobile communication system even in places like premises and underground passages.

16 Claims, 7 Drawing Sheets

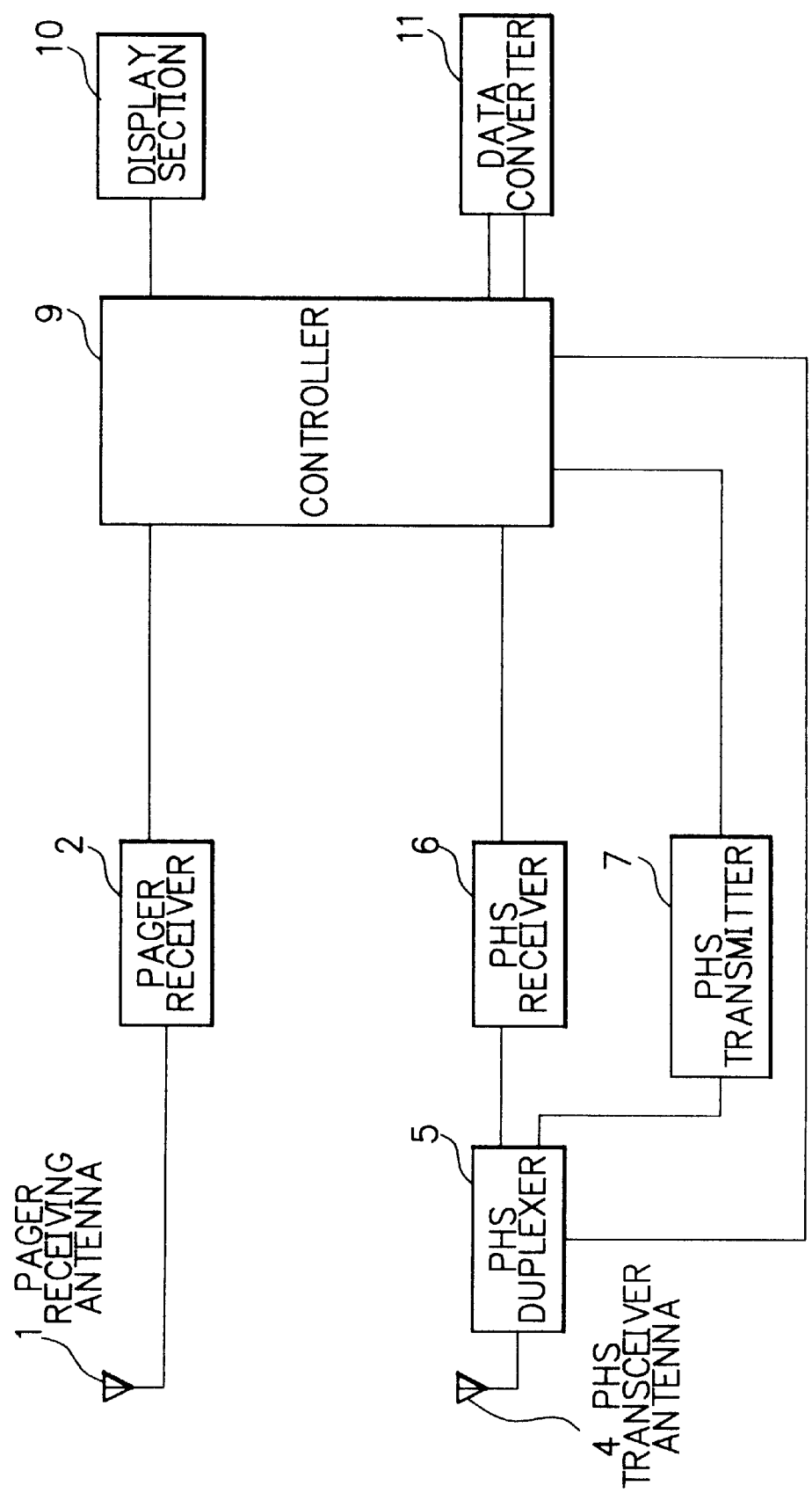

MOBILE COMMUNICATION SYSTEM WITH MOBILE TERMINAL EQUIPMENT INCLUDING BOTH PHS AND PAGER SUBSYSTEMS

BACKGROUND OF THE INVENTION

The present invention relates to a mobile communication system and a mobile terminal equipment thereof. More particularly this invention relates to a mobile communication system and a mobile terminal equipment which consist of PHS (personal hand-held phone system) system and a pager (radio selective-calling receiver) system.

DESCRIPTION OF THE RELATED ART

With regard to the conventional mobile communication system utilizing both the PHS system and the pager system, the principle aim thereof is to improve the reception performance of the terminal equipment as a PHS terminal. For instance, in Japanese Patent Application Laid-Open No. HEI 05-211679, there is disclosed an application of such mobile communication system. According to the disclosure, a communication system in which there exists a terminal being capable of communicating through radio with a plurality of radio base stations which are linked with an exchange connected to the public telecommunication network. In use, individual number applied to a certain mobile terminal equipment is transmitted from a radio transmission station for paging which is effective over a large area. There is provided a reception station which receives the radio waves from the radio transmission station for paging at outdoor. The individual number of a certain mobile terminal equipment is transferred to the indoor exchange linked with a plurality of radio base stations. It causes a start signal to transfer to be transmitted to a terminal which has the corresponding individual number through either all or certain of those radio base stations.

Thus, in the conventional radio communication system including both the PHS system and the pager system, the extensive service area of the pager system is effectively utilized, so as to make the reception for the PHS easier.

However, for the conventional mobile communication system is constituted in the above manner, when it causes the signal to be transmitted to the terminal located within an area which is not covered by the pager system such as premises underground and so forth, the information from the radio transmission station for paging such a pager system which covers large zone, needs to be drawn as far as the PHS radio base station arranged in places such as premises underground. Thus it is necessary in such a case that an exclusive indoor wiring by an exclusive reception station or cables should be newly arranged. Consequently, when it comes to a point where communication channels need to be increased for the sake of a future benefit, exclusive in-door wiring needs to be arranged in addition to the ordinary PHS base station facilities. This will result in wiring complications eventually leading to a problem that the whole system will hold a low extensibility and be costly.

Concerning the conventional mobile communication system, it has been a premise that a PHS system does not conduct position registration. Therefore, when the terminal is located on a place which is not capable of being covered by either the pager system or the PHS system, there would be possible unnecessary call transmissions from the paging transmitting station of the pager system having no chance of being received by the terminal. This will cause an unnecessary increase in the radio traffic of the pager system, such a problem needs to be resolved in the field of mobile communication where an effective use of radio waves is a big issue now as the radio communication channels are becoming short.

Moreover, with respect to a terminal located on such areas like premises underground, which are not capable of being covered by the pager system, the system will be transmitting only reception start signals for the PHS. Thus, the system is not provided with any means of data reception for the pager, which makes it impossible for the pager to receive data.

SUMMARY OF THE INVENTION

In view of the foregoing, it is an object of the present invention for overcoming the above mentioned problem, to provide a radio communication system and a mobile terminal equipment utilizing a PHS system as well as a pager system.

According to a first aspect of the present invention, there is provided a mobile terminal equipment comprising, a pager electric field level monitor section for judging whether or not a pager reception section is within a service area of a pager base station, a PHS electric field level monitor section for judging whether or not a PHS receiving section is within a service area of a PHS base station, and a control section for controlling a pager calling or PHS calling by the pager base station or the PHS base station, such control being conducted in accordance with the judging result by the pager electric field level monitor section arid the PHS electric field level monitor section.

With regard to a second aspect of the present invention there is provided a mobile terminal equipment according to the first aspect of the present invention comprising, a data converting section for converting pager data being transmitted from the PHS base station having a PHS data format into pager data having a pager data format, and a display section for displaying the pager data being converted into a pager data format at the data converting section.

Concerning the third aspect of the present invention, there is provided a mobile communication system having a mobile terminal equipment and a control station, the mobile terminal equipment comprising, a pager electric field level monitor section for judging whether or not a pager reception section is within a service area of a pager station, a PHS electric field level monitor section for judging whether or not a PHS reception section is within a service area of a PHS base station, and a control section for controlling a pager calling or PHS calling by the pager base station or the PHS base station, such control being conducted in accordance with the judging result by the pager electric field level monitor section and the PHS electric field level monitor section, the control station comprising the steps of calling the mobile terminal equipment on receiving a calling request from the pager base station by utilizing the PHS base station in a case where it is judged that the mobile terminal equipment is not located within the service area of the pager base station, converting pager data which is supposed to be transmitted from the pager base station to the mobile terminal equipment into a data having a PHS data format, and transmitting the converted pager data to the mobile terminal equipment.

With respect to the fourth aspect of the present invention, there is provided a mobile communication method for utilization in a mobile communication system having a mobile terminal equipment and a control station, comprising the steps of, calling the mobile terminal equipment on receiving a calling request from the pager base station by utilizing the pager base station in a case where it is judged that the mobile terminal equipment is located within the service area of the pager base station, and transmitting the pager data to the mobile terminal equipment.

According to the fifth aspect of the present invention, there is provided a mobile communication method for utilization in a mobile communication system having a mobile terminal equipment and a control station, comprising the steps of transmitting a PHS calling request toward the mobile terminal equipment from the pager base station in case when a position registration of the mobile terminal equipment is not properly made to the PHS base station, and changing the communication pattern so that a notice for the calling request from the PHS base station is dealt by way of notifying the terminal device of the PHS calling request along with data including terminal information etc. of the caller through the pager base station.

The above and further objects and the novel features of the invention will more fully appear from the following detailed description when the same is read in connection with the accompanying drawings. It is to be expressly understood, however, that the drawings are for illustration only and are not intended as a definition of the limits of the invention.

BRIEF DESCRIPTION OF THE DRAWINGS

FIG. 7 is a block diagram showing the mobile terminal equipment of a third embodiment according to the present invention.

DETAILED DESCRIPTION OF THE PREFERRED EMBODIMENTS

A preferred embodiment of the present invention will now be described in detail referring to the accompanying drawings.

Figure 1:
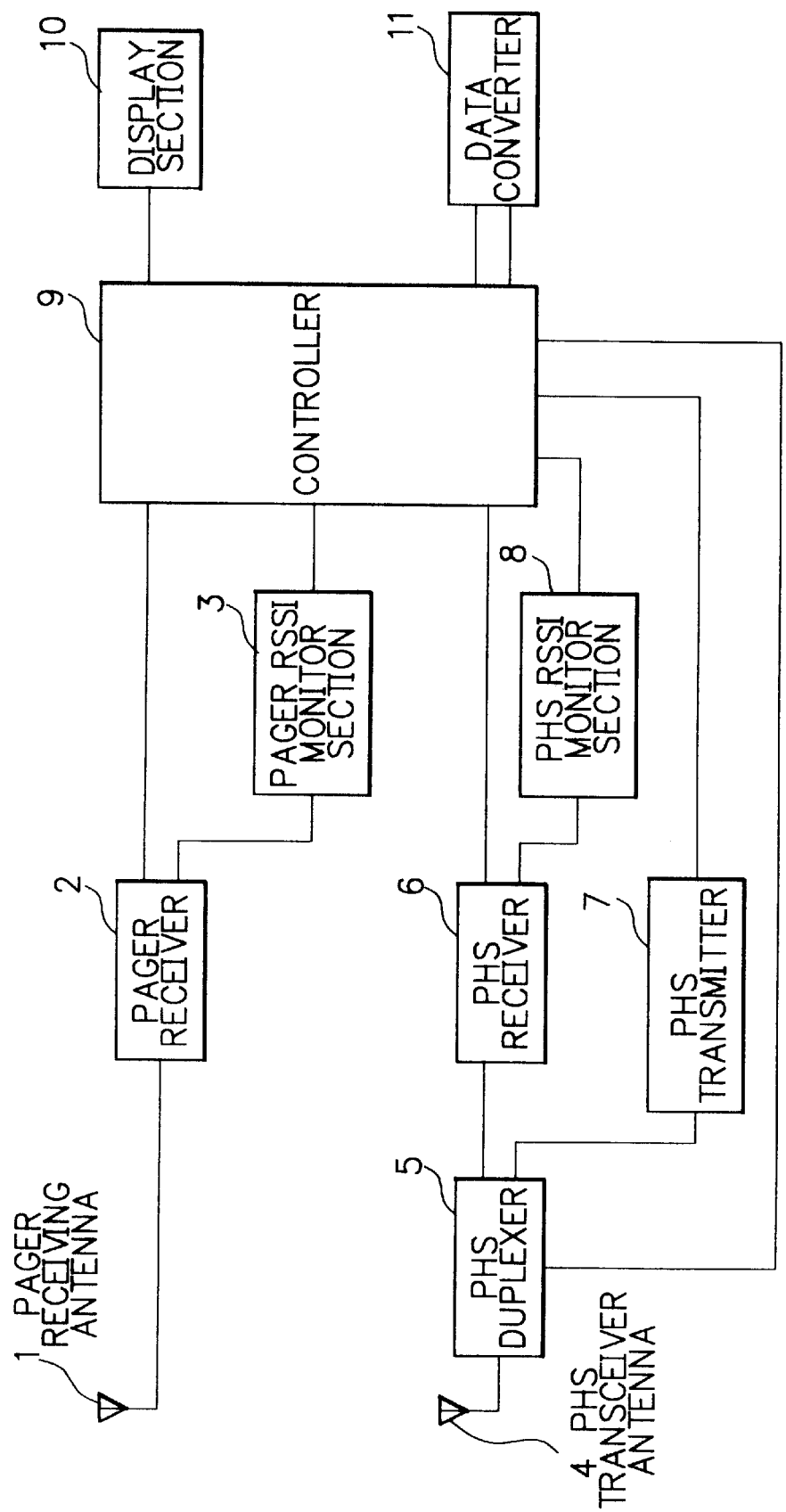
FIG. 1 is a block diagram showing a mobile terminal equipment of a first embodiment according to the present invention.

Now the first embodiment of the present invention will be described with reference to FIGS. 1 to 5. FIG. 1 is a block diagram showing the internal circuit of the mobile terminal equipment serving as a pager terminal including the PHS function. In the following, this mobile terminal equipment will be referred to as a mobile terminal. In FIG. 1, reference numeral 2 denotes a pager receiver. As the pager calling radio wave in the air is inputted to the pager receiver 2 through a pager reception antenna 1, the pager receiver 2 will convert the radio wave into an audio frequency band signal. Then the pager receiver 2 functions such that the audio frequency band signal is inputted both to a pager RSSI (electric field level) monitor section 3, and to a control section 9 respectively. According to the audio frequency band signal from the pager receiver 2, the pager RSSI monitor section 3 periodically monitors the electric field strength of the pager calling radio wave, and notifies the control section 9 whether it is exceeding a certain predetermined electric field strength or below that. Such periodical monitoring operation at the pager RSSI monitor section 3 is carried out at reception of a synchronizing signal which is periodically transmitted from the pager base station.

Figure 2:
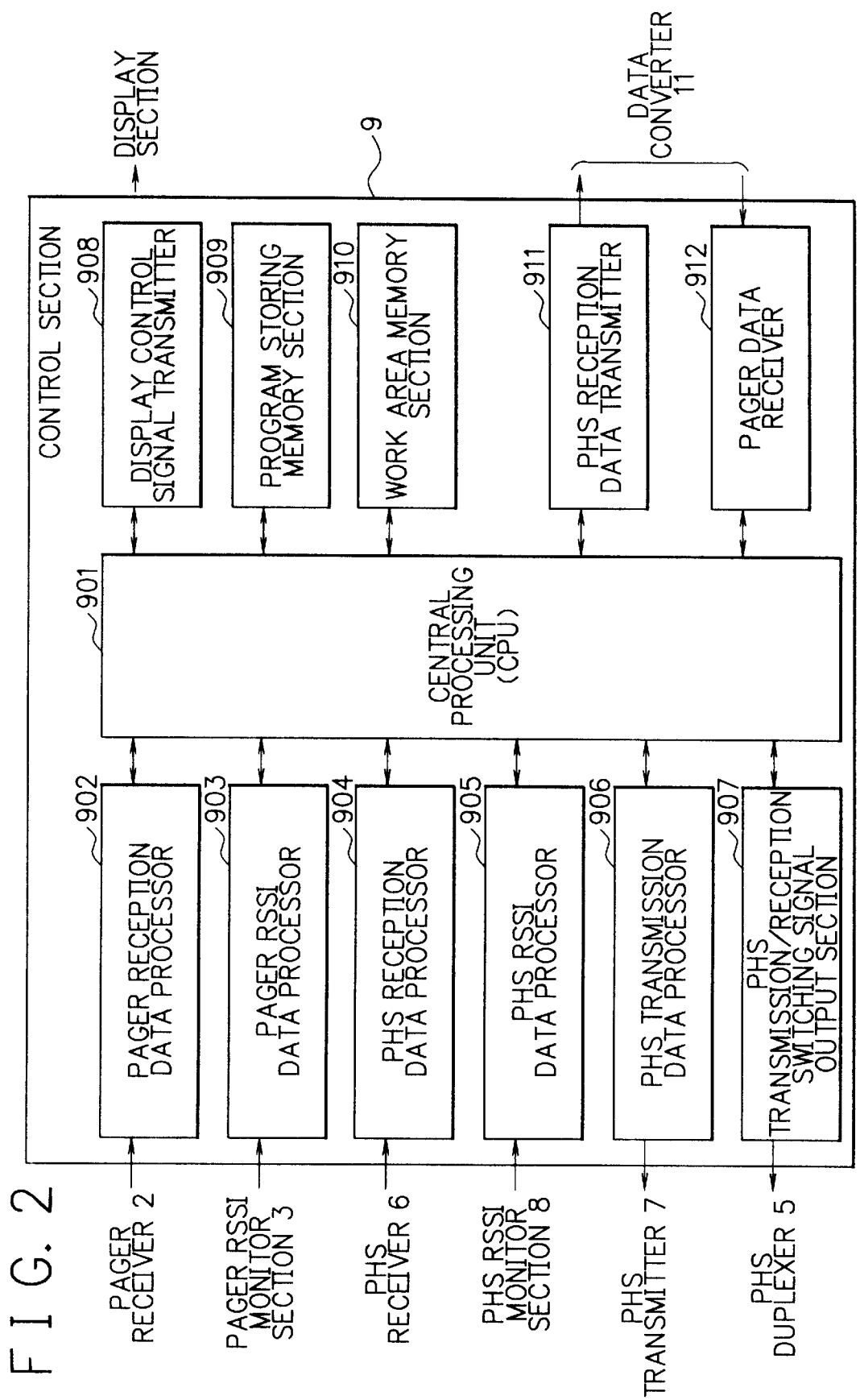
FIG. 2 is a block diagram showing a control section of the mobile terminal equipment of FIG. 1.

FIG. 2 is a block diagram showing internal circuit of the control section 9. Whole constitutional elements of the control section 9 are controlled by a central processing unit (CPU) 901. There is provided a program storing memory section 909 for storing main program which governs operation of the central processing unit 901, and a work area memory section 910 which the central processing unit 901L uses for a purpose of a work area.

A pager reception data processor 902 stores data being received from the pager receiver 2 into an internal register thereof. The central processing unit 901 reads in data stored in the internal register in the pager reception data processor 902, thus writing display content to a register within display control signal transmitter 908, while processing the data. The display control signal transmitter 908 transmits a display control signal to the display section 10 in accordance with the content written at the internal register.

When a pager RSSI data processor 903 receives notification from the pager RSSI monitor section 3, the pager RSSI data processor 903 generates an interrupt signal in answer to the notification content toward the central processing unit 901. The central processing unit 901 receiving the interrupt signal writes display content to the register within the display control signal transmitter 908, while executing interrupt handling, before notifying termination of interrupt handling to the pager RSSI data processor 903. When the pager RSSI data processor 903 is notified of termination interrupt handling, it removes interrupt signal being generated to the central processing unit 901.

A PHS reception data processor 904 stores data received from the PHS receiver 6 in an internal register. The central processing unit 901 reads in data which is stored in a register within the PHS reception data processor 904, thus processing the data, before writing display content to a register within the display control signal transmitter 908. The display control signal transmitter 908 transmits a display control signal to the display section 10 in accordance with the content being written at the internal register.

When a PHS RSSI data processor 905 receives a notification from the PHS RSSI monitor section 8, the PHS RSSI data processor 905 generates an interrupt signal in answer to the notification content toward the central processing unit 901. The central processing unit 901 receiving the interrupt signal executes interrupt handling, thus writing display content to a register within the display control signal processor 908, before notifying termination of the interrupt handling to the PHS RSSI data processor 905. When the PHS RSSI data processor 905 is notified of termination of the interrupt handling it removes the interrupt signal being generated thereto from the central processing unit 901.

When PHS data transmission is implemented, PHS transmission data is written from the central processing unit 901 to an internal register of the PHS transmission data processor 906. The PHS transmission data processor 906 is controlled so as to output the PHS transmission data being written at the internal register with prescribed transmission timing. A transmission/reception switching signal output section 907 is controlled by the central processing unit 901, thus generating transmission/reception switching signal toward the PHS duplexer 5 with the prescribed transmission timing.

A PHS reception data transmitter 911 equips a register which stores pager data of the PHS data format. When the data is written from the central processing unit 901, the PHS reception data transmitter 911 transmits the data toward the data converter 11 in order.

A pager data receiver 912 receives data which is converted into pager data format at the data converter 11, thus storing into a register equipped inside thereof. The central processing unit 901 reads in the data from the pager data receiver 912 in order, thus processing the data, before writing display content to internal register of the display control signal transmitter 908. The display control signal transmitter 908 transmits display control signal to display section 10 in accordance with the content being written at the internal register.

When the control section 9 is notified by the pager RSSI monitor section 3 that the electric field strength of the pager calling radio wave is below the predetermined value such as for example 10 dB $\mu$, the control section 9 will display such a condition at a display section 10. At the same time, the control section 9 functions such that the PHS base station is notified of the monitored condition through a PHS transmitter 7, a PHS duplexer 5 and a PHS transceiver antenna 4. The PHS transceiver antenna 4 is used in both PHS transmission and PHS reception, and is connected to the PHS duplexer 5. The PHS transceiver antenna 4 will connect to the PHS receiver 6 or to the PHS transmitter 7 through the PHS duplexer 5 in accordance with the transmission/reception switching signal from the control section 9.

When the PHS reception radio wave in the air is inputted to the PHS receiver 6 through the PHS transceiver antenna 4 and the PHS duplexer 5, the PHS receiver 6 functions so as to convert the inputted PHS reception radio wave into an audio frequency band signal. This audio frequency band signal is then inputted to both the PHS RSSI monitor section 8 and the control section 9. The PHS RSSI monitor section 8 periodically monitors the electric field strength of the PHS reception radio wave in accordance with the audio frequency band signal from the PHS receiver 6. Then there is notification of the control section 9 whether the electric field strength is above the predetermined value or below that. The periodic monitoring operation by the PHS RSSI monitor section 8 is carried out at the time of reception of a synchronizing signal which is being periodically transmitted from the PHS base station. Moreover, when the control section 9 is being informed by the PHS RSSI monitor section 8 that the electric field strength is lower than the predetermined value such as for example, in the public PHS terminal; 24 dB $\mu$, or in the central PHS terminal; 22 dB $\mu$, the control section 9 functions to display the acquired state of the PHS reception radio wave at the display section 10.

On the other hand, the pager data from the PHS base station is converted into a PHS data format and received through the PHS transceiver antenna 4, a PHS duplexer 5, and a PHS receiver 6 respectively. At the PHS receiver 6, the pager data of a PHS data format is converted into an audio frequency band signal and received by the control section 9. After that, the audio frequency band signal is converted into a pager data format at a data converter 11 and received again by the control section 9 to be displayed at the display section 10. The control section 9 is provided with a 4-bit flag register for a display control at the inside thereof thus implementing a notice control toward the PHS base station. By these flags, the control section 9 carries out branching control at each operation branch point.

Among those four bits, the first bit is a PHS inner area flag, which is set when the control section 9 is informed by the PHS RSSI monitor section 8 that the electric field strength is being changed from a value below the prescribed electric field strength to a value above the same. The PHS inner area flag is cleared as it is displayed at the display section 10 that the mobile terminal is located within the PHS service area.

The second bit is a PHS outer area flag, which is set when the control section 9 is informed by the PHS RSSI monitor section 8 that the electric field strength is being changed from a value above the prescribed electric field strength to a value below the same. The PHS outer area flag is cleared as it is displayed at the display section 10 that the mobile terminal is located outside the PHS service area.

The third bit is a pager inner area flag which is set when the control section 9 is informed by the pager RSSI monitor section 3 that the electric field strength is altered from a value below the predetermined electric field strength to a value above the same. As to the third flag, there are two occasions when it is cleared. One is when the pager outer area flag of the fourth bit is being set. And the other is when it is displayed at the display section 10 that the mobile terminal is located within the pager base station service area, and such a condition is notified to the PHS base station by which the flag is reset.

The fourth bit is a pager outer area flag which is set when the control section 9 is notified by the pager RSSI monitor section 3 that the electric field strength is being changed from a value above the predetermined electric field strength to a value below the same. As to the fourth flag, there are two occasions when it is cleared. One is when the pager inner area flag of the third bit is being set, and the other is when it is displayed at the display section 10 that the mobile terminal is located outside the pager service area, and such a condition is notified to the PHS base station by radio, by which the flag is reset.

Figure 3:
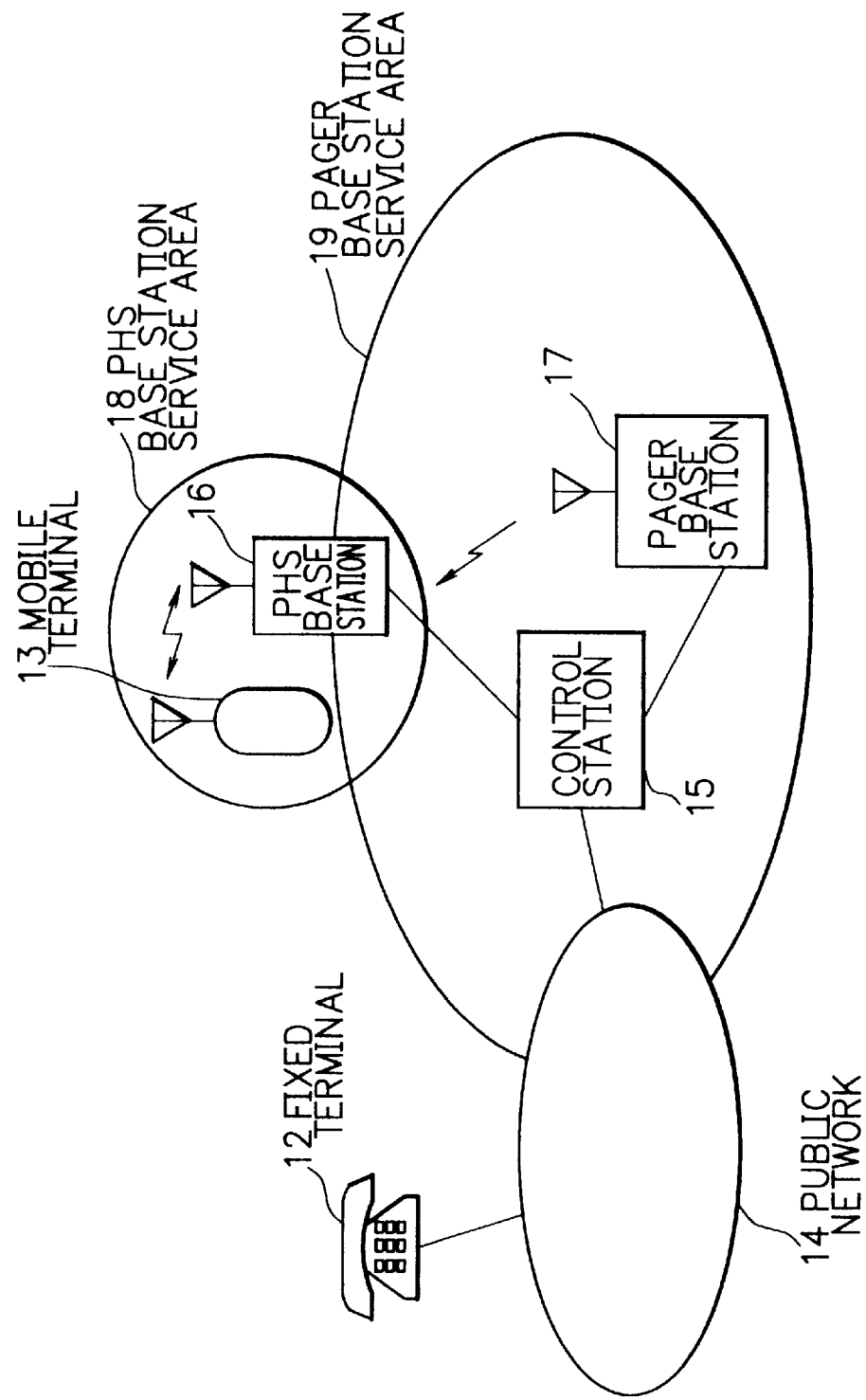
FIG. 3 is a conceptual diagram showing the mobile communication system of the first embodiment according to the present invention.

FIG. 3 shows the mobile communication system as the first embodiment of the present invention where the mobile terminal is called up as a pager terminal by a general fixed terminal. In FIG. 3, the public network 14 is connected to the fixed terminal 12 and to the control station 15. The PHS base station 16 and the pager base station 17 are connected to the control station 15 respectively. The control station 15 governs communication control among the public network 14, the PHS base station 16, and the pager base station 17. A PHS base station service area 18 is an area that the PHS base station 16 is capable of covering. A pager base station service area 19 is an area that the base station 17 is capable of covering.

A reference numeral 13 denotes a mobile terminal. It is this mobile terminal equipment 13 that radio-communicates both with the PHS base station 16 and the pager base station 17. The mobile terminal equipment 13 carries out synchronization establishment as well as synchronization holding operation with the PHS system by using a synchronizing signal which is periodically transmitted from the PHS terminal station 16. Moreover, the mobile station 13 periodically sends self ID data to the PHS base station 16, so as to implement position registration of itself to the PHS system. Further, the mobile terminal equipment 13 also implements synchronization establishment as well as synchronization holding operation with the pager system by using a synchronizing signal which is periodically transmitted from the pager base station 17.

Then the mobile terminal equipment. 13 notifies the PHS base station 16 of the synchronization status with the pager system by way of radio. It informs the PHS station 16 when it fails in synchronizing with the pager system and also when it succeeds in synchronizing with the pager system after the failure. The information including the synchronization status between the mobile terminal equipment 13 and the pager system, and the position registration status of the mobile terminal equipment 13 is received by the PHS base station 16, and then passed on to the control station 15. According to those pieces of information, the control station L5 is to switch the communication pattern according to the circumstances.

Figure 4:
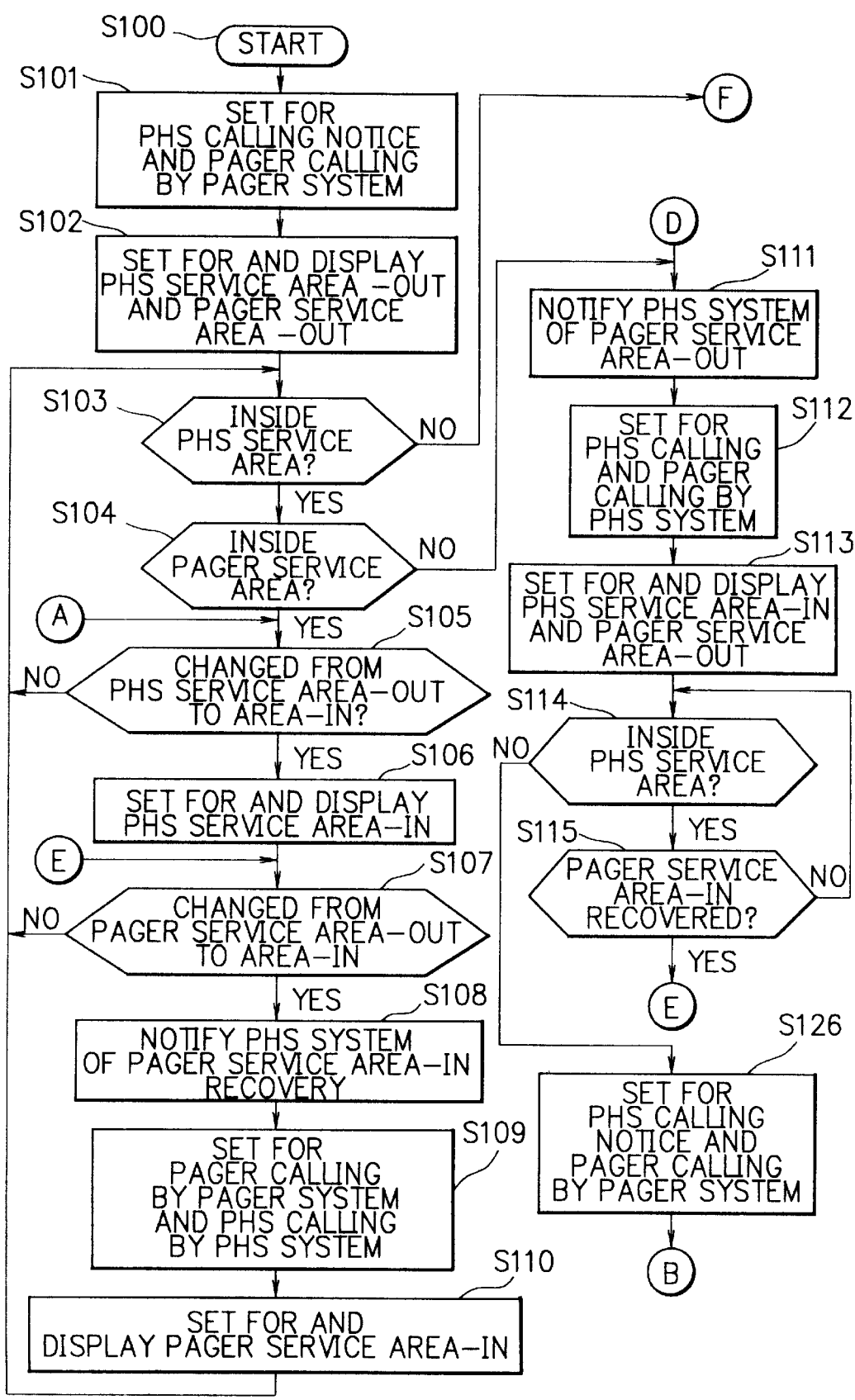
FIG. 4 is a flow chart showing the operation of the mobile communication system of the first embodiment according to the present invention.
Figure 5:
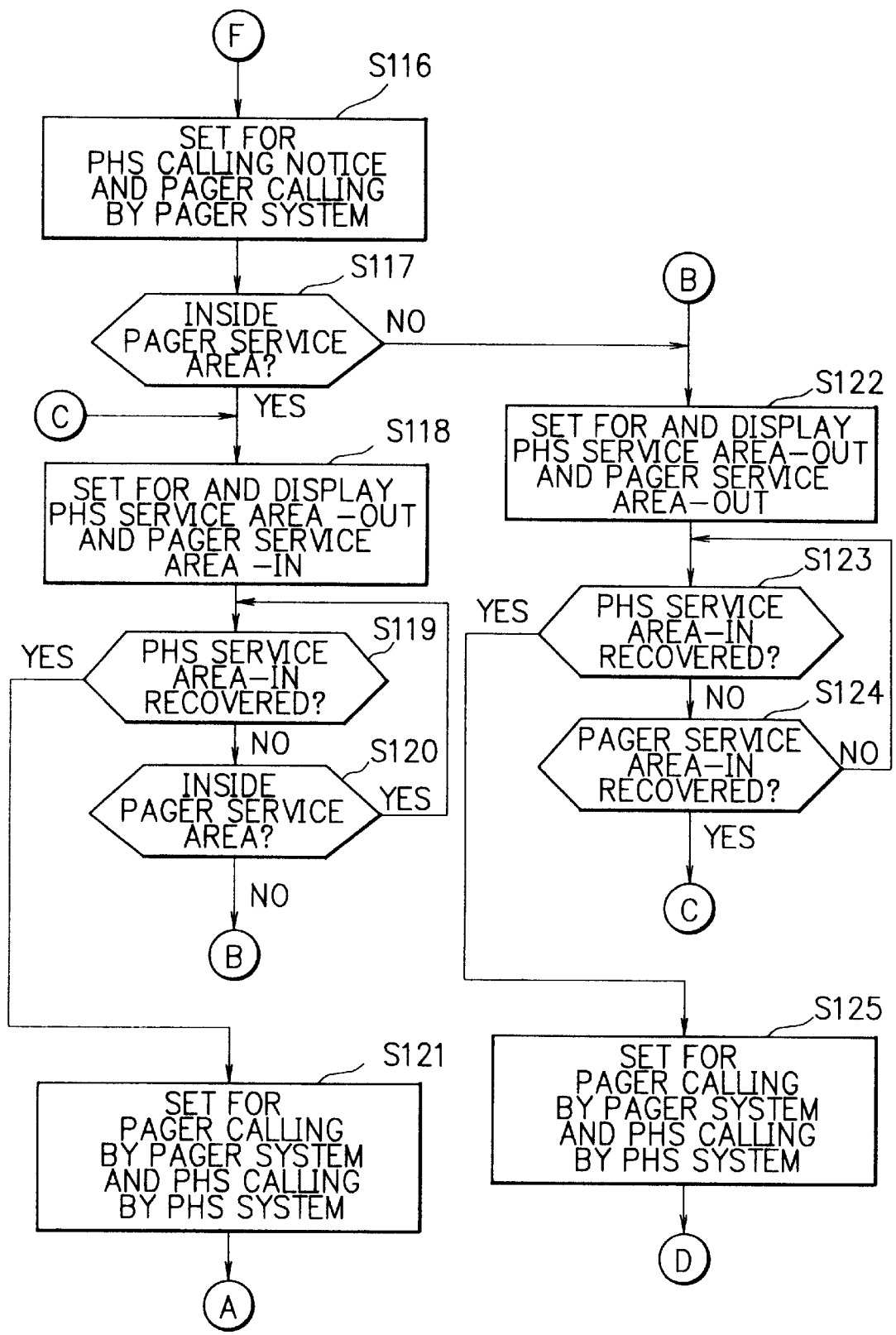
FIG. 5 is a flow chart showing the operation of the mobile communication system of the first embodiment according to the present invention.

Next, operation of the mobile communication system of the first embodiment will be described with reference to the flow charts shown in FIGS. 4 and 5. To begin with, a description of the first case where the mobile terminal equipment 13 is located within both the PHS base station service area 18 and the pager base station service area 19 will be begin. In the operation starting (step S100), power is supplied to the mobile terminal equipment 13. At the operation starting, synchronizations between the mobile terminal equipment 13 and the PHS base station 16, and between the mobile terminal equipment 13 and the pager base station 17 are not established respectively. The control station 15 takes this situation as an initial state. In the initial setting, the communication pattern between the mobile terminal equipment 13 and the base station is set so that a PHS calling notice and an ordinary pager calling from the pager base station 17 can be carried out (step S101).

The PHS calling notice is an information being generated when a call for the mobile terminal equipment 13 as a PHS terminal is generated from the fixed terminal 12. In this occasion, the control station 15 informs the mobile terminal equipment 13 through the pager base station 17 only the fact that there has been a PHS calling. When the control station 15 is previously informed by the PHS base station 16 that the synchronization with the mobile terminal equipment 13 and the PHS base station 16 is not being established, the control station 15 determines that communication is impossible between the mobile terminal equipment 13 and the PHS base station 16. Then the control station 15 controls the pager base station 17 which has greater possibility of communicating with the mobile terminal equipment 13, so that it will send PHS calling notice to the mobile terminal equipment 13.

Here, the term starting from the point where power is being supplied till the point where synchronizations between the PHS base station 16 and the pager base station 17 respectively are established is recognized as an initial state by the mobile terminal equipment 13. In this occasion, the mobile terminal equipment 13 causes the display section 10 to display that it is located outside both PHS base station service area 18 and the pager service area 19 (step S102) After that, the mobile terminal equipment 13 tries to arrange synchronization with the PHS base station 16 in accordance with the synchronizing signal being periodically transmitted from the PHS base station 16. Then, the mobile terminal equipment 13 will maintain the synchronization by periodically receiving the synchronizing signal from the PHS base station 16. Likewise, the mobile terminal equipment 13 is to arrange synchronization with the pager base station 17 in accordance with the synchronizing signal periodically transmitted from the pager base station 17. And the mobile terminal equipment 13 will maintain the synchronization by periodically receiving the synchronizing signal from the pager base station 17.

Once the mobile terminal equipment 13 enters the synchronization holding state, the mobile terminal equipment 13 is to monitor at the PHS RSSI monitor section 8 the field strength of the synchronizing signal being transmitted from the PHS base station 16 (step S103). When the mobile terminal equipment 13 judges that the field strength is above the prescribed value which is being set as a necessary condition for data reception, it will inform the control section 9 of such a state. At this point, the PHS inner area flag is set. From this point on, the mobile terminal equipment 13 is to periodically transmit the self ID data to the PHS base station 16 by virtue of the control section 9, and register its position to the PHS system.

Moreover, the pager RSSI monitor section 3 is to monitor the electric field strength of the synchronizing signal being transmitted from the pager base station 17 (step S104). When the pager RSSI monitor section 3 determines that the electric field strength of the synchronizing signal is above the prescribed value, the pager RSSI monitor section 3 will inform such a condition to the control section 9, after which the pager inner area flag is set. Then the control section 9 checks the PHS inner area flag (step S105), so as to acknowledge if it is set, and displays at the display section 10 that the mobile terminal is located inside the PHS base station service area 18 (step S106), after which it clears the PHS inner area flag. In addition, the control section 9 checks the pager inner area flag (step S107), so as to acknowledge if it is set, and informs the PHS base station 16 that the mobile terminal equipment 13 is located inside the pager base station service area 19 (step S108). Here the controller forwards the information to the PHS base station 16 through the PHS transmitter 7, the PHS duplexer 5 and the PHS transceiver antenna 4 by way of radio.

After this information is given to the control station 15 from the PHS base station 16, the communication pattern between the control section 15 and the mobile terminal equipment 13 will be shifted to a pattern where an ordinary PHS calling from the PHS base station 16 and an ordinary pager calling from the pager base station 17 are implemented (step S109). At this point, the mobile terminal equipment 13 is to display at the display section 10 that the mobile terminal equipment 13 is located within the pager base station service area 19 (step S110). Then, the mobile terminal equipment 13 will clear the pager inner area flag. From this point onward, the mobile terminal equipment 13 is to periodically repeat the monitoring operations on the electric field strength of the PHS synchronizing signal and the electric field strength of the pager synchronizing signal until a change in the electric field strength is noted.

Next, as a second case, an operational procedure of the system in case where the mobile terminal equipment 13 is located within the PHS base station service area 18 and is moved from the inside of the pager base station service area 19 to the outside of it, will be explained. Now, it is assumed that the electric field strength of the pager synchronizing signal denotes that it is below the prescribed value at the pager RSSI monitor section 3, as the monitoring operation like the one of step S104 is being carried out. When this is notified to the control section 9, the pager outer area flag is set. As the control section 9 confirms in this way that the pager outer area flag is set, the mobile terminal equipment 13 notifies the PHS base station 16 by means of radio that it is located outside the pager base station service area 19 (step S111). After this notification is passed on to the control station 15 from the PHS base station 16, the communication pattern will change to a pattern where an ordinary PHS calling from the PHS base station 16 and a pager calling from the PHS station 16 are carried out (step S112). At this point, the mobile terminal equipment 13 is to display at the display section 10 that the mobile terminal equipment 13 is located outside the pager base station service area 19 (step S113), after which it clears the pager outer area flag. Then the mobile terminal equipment 13 is to periodically repeat the monitoring operations on the electric field strength of the PHS synchronizing signal (step S114), and on the electric field strength of the pager synchronizing signal (step S115), until there is a change in the state of the electric field strength.

Now as a third case of the present embodiment, the description will be given on the operational procedure where the mobile terminal equipment 13 is located within the PHS base station service area 18 and is moved from the outside of the pager base station service area 19 to the inside of it. Here, it is assumed that the electric field strength of the pager synchronizing signal is judged by the pager RSSI monitor section 3 to be above the predetermined value at step S115 where the electric field strength of the pager synchronizing signal is monitored, as in the above-mentioned second case. This state of the pager synchronizing signal is then notified to the control section 9, after which the pager inner area flag is set. As the control section 9 confirms that the pager inner area flag is set (step S107), the mobile terminal equipment 13 informs the PHS base station 16 by way of radio that the mobile terminal equipment 13 is located within the pager base station terminal service area 19 (step S108). The rest of the sequence is the same as that following step S109.

As the fourth case of the embodiment, the operational procedure of the mobile communication system where the mobile terminal equipment 13 is located within the pager base station service area 19 and is moved from the inside of the PHS base station service area 18 to the outside of it, will be described. Now it is assumed that the electric field strength of the PHS synchronizing signal is confirmed as being below the prescribed value at step S103 where the monitoring operation on the electric field strength of the PHS synchronizing signal is implemented as in the first case. This state of the PHS synchronizing signal is then notified to the control section 9, after which the PHS outer area flag of the control section 9 is set. After the point where the control section 9 confirms that the PHS outer area flag is set, the mobile terminal equipment 13 terminates the self ID data transmission to the PHS base station 16 by virtue of the control section 9, and also stops the self position registration to the PHS system. Since the self ID data will not be transmitted from the mobile terminal equipment 13, an adequate position registration can not be expected. Consequently, the control station 15 will determine that the mobile terminal equipment 13 is being switched off, or that the mobile terminal equipment 13 is located outside the PHS base station service area 18 so that the control station 15 changes its communication pattern between itself and the mobile terminal equipment 13 into the one where a PHS calling notice as well as an ordinary pager calling from the pager base station 17 are carried out (step S116). After that, the pager RSSI monitor section 3 is to monitor the electric field strength of the pager synchronizing signal (step S117). In case when the pager RSSI monitor section 3 confirms that the electric field strength of the pager synchronizing signal exceeds the prescribed value, it will inform such a condition to the control section 9. Then the control section 9 is to display to the display section 10 the fact that it is located outside the PHS base station service area 18 (step S118), after which it clears the PHS outer flag of the control section 9. Then the mobile terminal equipment 13 periodically repeats the monitoring operations on the electric field strength of the PHS synchronizing signal (step S119) and on the electric field strength of the pager synchronizing signal (step S120) until there is a change in the state of the field strength.

As the fifth case of the present embodiment, the operational procedure of the mobile communication system where the mobile terminal equipment 13 is located within the pager base station service area 19 and is moved from the outside of the PHS base station service area 18 to the inside of it, will be described. Now it is assumed that the electric field strength of the PHS synchronizing signal appears to be above the prescribed value at the PHS RSSI monitor section 8 while it monitors the electric field strength of the PHS synchronizing signal at step S119. When such a state is informed to the control section 9, the PHS inner area flag of the control section 9 is set. After the point where the control section 9 confirms that the PHS, inner area flag is set, the mobile terminal equipment 13 will periodically transmit the self ID data to the PHS base station 16 by virtue of the control section 9, and it will also carry out its self position registration to the PHS system.

As the self ID data from the mobile terminal equipment 13 is received by the PHS base station 16 and the position registration is completed, the control station 15 is to determine that the mobile terminal equipment 13 is located within the PHS base station service area 18. After that, the control station 15 is to change the communication pattern between the mobile terminal equipment 13 and itself into the one where a normal PHS calling by the PHS base station 16 and a normal pager calling by the pager base station 17 are implemented (step S121). As the control section 9 checks the PHS inner area flag (step S105), and confirms that it is set, it will display at the display section 10 that the mobile terminal equipment 13 is located within the PHS base station service area 18 (step S106), by which it will clear the PHS inner area flag. Furthermore, as the control section 9 checks the pager inner area flag (step S107), and confirms that it is cleared, the control section 9 will periodically repeat the monitoring operations on the electric field strength of the PHS synchronizing signal (step S103), and on the electric field strength of the pager synchronizing signal (step S104) until there is a change in the state of the electric field strength.

As a sixth case of the present embodiment, the operational procedure of the mobile communication system in which the terminal 13 is located outside both the PHS base station service area 18 and the pager base station service area 19, will be described. Now it is assumed that the electric field strength of the PHS synchronizing signal denotes that it is below the prescribed value at the PHS RSSI monitor section 8 while it monitors the electric field strength of the PHS synchronizing signal at step S103. When this state of the PHS synchronizing signal is informed to the control section 9, the PHS outer area flag of the control section 9 is set. At the point after the control section 9 confirms that the PHS outer area flag is set, the mobile terminal equipment 13 is to stop transmitting the self ID data to the PHS base station 16 by virtue of the control section 9, after which it will stop its self position registration to the PHS system. Since the self ID data will not be transmitted from the mobile terminal equipment 13, an appropriate position registration can not be expected. Consequently, the control station 15 will determine that the mobile terminal equipment 13 is being switched off, or that the mobile terminal equipment 13 is located outside the PHS base station service area 18. Then the control station 15 changes its communication pattern between itself and the mobile terminal equipment 13 to the one where a PHS calling notice as well as a normal pager calling from the pager base station 17 are implemented (step S116).

After that, the pager RSSI monitor section 3 is to monitor the electric field strength of the pager synchronizing signal (step S117). In case when the pager RSSI monitor section 3 confirms that the electric field strength of the pager synchronizing signal is below the prescribed value, it will inform such a condition to the control section 9, upon which the pager outer area flag is set. As the control section 9 confirms that the PHS outer area flag and the pager outer area flag are set, it will display at the display section 10 that it is located outside both the PHS base station service area 18 and the pager base station service area 19 (step S122), upon which it clears the PHS outer area flag of the control section 9. Moreover, because the mobile terminal equipment 13 is located outside the PHS base station service area 18, it will not send information to the PHS base station 16 by radio. Therefore, the pager outer area flag of the control section 9 is to maintain its state of being set. After that, the mobile terminal equipment 13 is to periodically repeat the monitoring operations on the electric field strength of the PHS synchronizing signal (step S123) and the electric field strength of the pager synchronizing signal (step S124) until there is a change in the state of the electric field strength.

Next, as a seventh case of the present embodiment, the operational procedure of the mobile communication system in which the mobile terminal equipment 13 is located outside of the pager base station service area 19 and is moved from the outside of the PHS base station service area 18 to the inside of the same, will be described. NOW it is assumed that the electric field strength of the PHS synchronizing signal exceeds the prescribed value at the PHS RSSI monitor section 8 while it monitors the electric field strength of the PHS synchronizing signal at step S123. When this state of the PHS synchronizing signal is informed to the control section 9, the PHS inner area flag of the control section 9 is set. At the point after the control section 9 confirms that the PHS inner area flag is set, the mobile terminal equipment 13 periodically transmits the self ID data to the PHS base station 16 by virtue of the control section 9, and carries out its self position registration to the PHS system.

As the self ID data from the mobile terminal equipment 13 is received by the PHS base station 16 and the position registration is completed, the control station 15 determines that the mobile terminal equipment 13 is within the PHS base station service area 18. After that, the control station 15 changes the communication pattern between the mobile terminal equipment 13 and itself into the one where a normal PHS calling by the PHS base station 16 and a normal pager calling by the pager base station 17 are executed (step S125). Further, as the control section 9 confirms that the pager outer area flag is set, it will determine that the PHS base station 16 is not yet informed of the situation where the mobile terminal is located outside the pager base station service area 19, by which it is to inform such a condition to the PHS base station 16 by radio (step S111).

When this information is sent from the PHS base station 16 and received by the control station 15, the communication pattern between the control station 15 and the mobile terminal equipment 13 beyond this point will change to the one where a normal PHS calling and a pager calling by the PHS base station 16 are carried out (step S112). At the same time, the mobile terminal equipment 13 is to display at the display section 10 that it is located within the PHS base station service area 18 and outside the pager base station service area 19 (step S113), after which it is to clear both the PHS inner area flag and the pager outer area flag of the control section 9. The sequence of operations after this point is the same as that after step S114.

As an eighth case of the present embodiment, the operational procedure of the mobile communication system in which the mobile terminal equipment 13 is located outside of the PHS base station service area 18 and moved from the outside of the pager base station service area 19 to the inside of the same, will be described. Now it is assumed that the electric field strength of the pager synchronizing signal is determined as being over the prescribed value at the RSSI monitor section 3 while it monitors the electric field strength of the pager synchronizing signal at step S124. This state of the pager synchronizing signal is informed to the control section 9. Then the pager inner area flag of the control section 9 is set.

As the control section 9 confirms that the pager inner area flag is set, it will display at the display section 10 that it is inside the pager base station service area 19 (step S118). Moreover, since the mobile terminal equipment 13 is outside the PHS base station service area 18, it will not inform the PHS base station 16 of its state by radio. Therefore, the pager inner area flag of the control section 9 is to remain set. The sequence of operations after this point is the same as that after step S119.

As a ninth case of the present embodiment, the operational procedure of the mobile communication in which the mobile terminal equipment 13 is located outside the pager base station service area 19 and is being moved from the inside of the PHS base station service area 18 to the outside of the same, will be described. Now it is assumed that the electric field strength of the PHS synchronizing signal denotes that it is below the prescribed value at the PHS RSSI monitor section 8 while it monitors the electric field strength of the PHS synchronizing signal at step S114. When this state of the PHS synchronizing signal is informed to the control section 9, the PHS outer area flag of the control section 9 is set. At the point after the control section 9 confirms that the PHS outer area flag is set, the mobile terminal equipment 13 stops transmitting the self ID data to the PHS base station 16 by virtue of the control section 9, and terminates its self position registration to the PHS system.

Since the self ID data is not transmitted from the mobile terminal equipment 13, an appropriate position registration can not be expected. Consequently, the control station 15 will determine that the mobile terminal equipment 13 is switched off, or that the mobile terminal equipment 13 is located outside the PHS base station service area 18. Then the control station 15 changes the communication pattern between itself and the mobile terminal equipment 13 to the one where a PHS calling notice as well as an ordinary pager calling from the pager base station 17 are implemented (step S126). Then the control section 9 is to display at the display section 10 that it is outside the PHS base station service area 18 (step S141), after which it clears the PHS outer area flag of the control section 9. The sequence of operations after this point is the same as that after step S108.

As the tenth case of the present embodiment, the operational procedure of the mobile communication system in which the mobile terminal equipment 13 is located outside the PHS base station service area 18 and moved from the inside of the pager base station service area 19 to the outside of the same, will be described. Now it is assumed that the electric field strength of the pager synchronizing signal denotes that it is below the prescribed value at the pager RSSI monitor section 3 while it monitors the electric field strength of the pager synchronizing signal at step S120. When this state of the pager synchronizing signal is informed to the control section 9, the pager outer area flag of the control section 9 is set.

As the control section 9 confirms that the pager outer area flag is set, it will display at the display section 10 that it is located outside the pager base station service area 19 (step S122). Moreover, for the mobile terminal equipment 13 is outside the PHS base station service area 18, it will not inform the PHS base station 16 of its state by radio. Therefore, the pager outer area flag of the control section 9 is to maintain its state of being set. The sequence of operations after this point is the same as that following step S123.

According to the first embodiment, the mobile communication system integrates the PHS system with the pager system in itself. Thus, the system can provide data communications with higher reliability, as compared with the case where the system is not an integration of the two systems but either one of the two. Furthermore, as the present mobile communication system comprises the means of monitoring the field strength of the radio waves sent from the base stations, it can select the system with a higher connection reliability according to the result of the field strength monitoring. What is more, for the monitor level of the electric field can be set to an arbitrary value, the monitor level can be set strictly such that a system with a higher connection reliability can be selected promptly and switched into.

Figure 6:
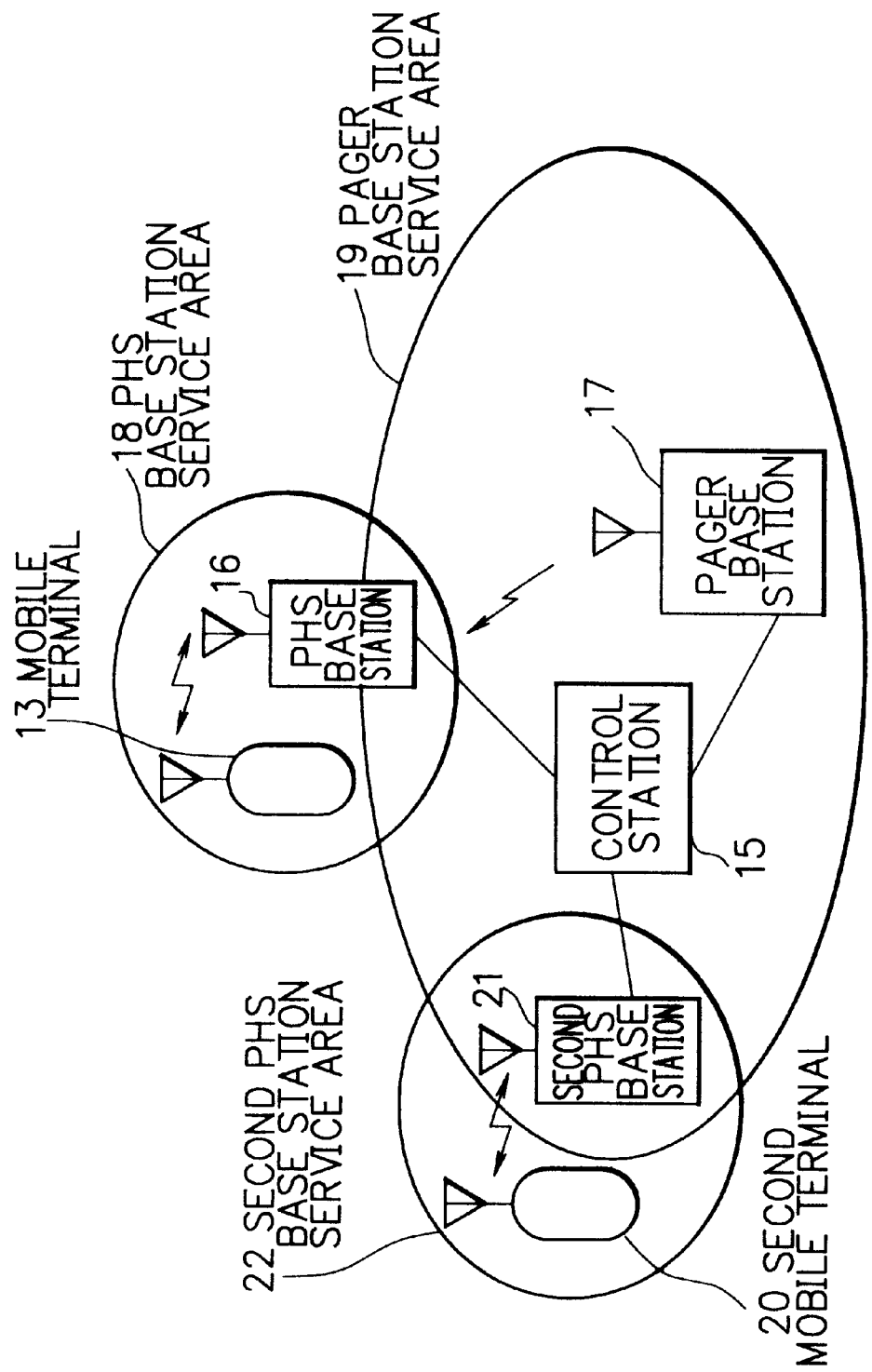
FIG. 6 is a conceptual diagram showing the mobile communication system of a second embodiment according to the present invention.

FIG. 6 shows a second embodiment of the present invention. Now, this embodiment will be described with reference to the figure. Here, a second PHS base station 21 is connected to the control station 15. This second PHS base station 21 is to cover a second PHS base station service area 22. Similarly to the mobile terminal equipment 13, a second mobile terminal 20 is a PHS terminal that carries out digital communication like PHSs and pagers. The second mobile terminal 20 is located within the second PHS base station service area 22. Now, it is assumed that the mobile terminal equipment 13 is moved to the outside of the PHS base station service area 18 and in condition of receiving PHS calling notice from the pager system. As the second mobile terminal 20 calls up the mobile terminal equipment 13, under such circumstances, the mobile terminal equipment 13 will receive from the pager base station 17 the calling notice from the second mobile terminal 20. In this occasion, it is also possible to inform the mobile terminal equipment 13 of the data including the PHS phone number etc. of the mobile terminal 20 as a caller along with the PHS calling notice, owing to the digital system. Therefore, regarding the mobile communication system according to this particular embodiment, another effect in addition to the effect of the first embodiment can be achieved. This additional effect is that arbitral data can be loaded to be received by the receiver terminal at the time of calling notice.

FIG. 7 illustrates a third embodiment of the present invention. Now, with reference to this figure, the third embodiment will be described. According to this embodiment, the pager RSSI monitor section 3 and the PHS RSSI monitor section 8 are not provided. Thus, the electric field strength is not being monitored. Instead, the control section 9 is to judge whether the mobile terminal is within the base station service area or not according to the synchronization state. In this manner, the internal circuit of the mobile terminal can be simplified, and at the same time, the terminal can be miniaturized.

Accordingly, by utilizing both the PHS system and the pager system, and selecting the one with the higher communication reliability to be switched into, communication reliability is improved. Further, by notifying the system that the moving mobile terminal equipment is presently outside the pager service area, and switching the communication mode so that the pager calling should originate from the PHS system, effective utilization of frequency resources can be achieved at the pager system.

According to the present invention, as described above, it is possible to receive the pager data as long as the mobile terminal serving as the mobile terminal equipment is within either the pager base station service area or the PHS base station service area. Owing to such arrangements, the mobile terminal equipment can improve its reception performance as well as its communication reliability as a pager terminal. Moreover, according to the present mobile communication system, there is no need for arranging reception stations and wires particularly for pager communication in places like premises and underground passages.

Therefore, it is possible to construct an economical mobile communication system with an advantage that it can easily deal with an increase in communication channels at a low cost.

Furthermore, according to the present invention, the system will never let the pager base station call the mobile terminal equipment while the PHS base station is controlling the mobile terminal equipment calling. Under such circumstances, it is only the PHS base station that carries out the terminal callings. Accordingly, it is possible to eliminate unnecessary transmission traffic from the pager base station, which will lead to an advantage that limited frequency resources can be utilized effectively.

While preferred embodiments of the invention have been described using specific term, such description is for illustrative purposes only, and it is to be understood that changes and variations may be made without departing from the spirit or the scope of the following claims.

What is claimed is:

1. A mobile communication system comprising:
   a fixed terminal connected to a public telecommunication network;
   a control station connected to said fixed terminal through said public telecommunication network for controlling operation within said mobile communication system;
   a personal hand-held phone system (PHS) base station having a PHS base station service area which is capable of covering PHS communication, said PHS base station being connected to said control station;
   a pager base station having a pager base station service area which is capable of covering a pager communication, said pager base station being connected to said control station; and
   a mobile terminal equipment for implementing radio communication to both of said PHS base station and said pager base station which mobile terminal equipment executes a monitoring function for monitoring both electric field strength of a reception radio wave for PHS and electric field strength of a reception radio wave for a pager and executing a communicating function for communicating to one of said PHS and said pager base station based on a determination of said monitoring function, wherein both PHS calling and pager calling may be implemented by the PHS calling station and the terminal equipment is able to convert the PHS data to a pager data format where said terminal equipment is outside said pager base station service area.

2. The mobile communication system of claim 1, said mobile terminal equipment further comprising:
 a pager electric field level monitor section for implementing said monitoring functions and judging whether a pager receiver of said mobile terminal equipment is within said pager base station service area;
 a PHS electric field monitor section for implementing said monitoring function and judging whether a PHS receiver of said mobile terminal equipment is within said PHS base station service area; and
 a control section for implementing said communicating function to control either a pager calling or a PHS calling by either said pager base station or said PHS base station respectively, wherein control of said control section is implemented in accordance with a judging result by one of said pager electric field monitor section and said PHS electric field monitor section.

3. The mobile communication system of claim 2, said mobile terminal equipment further comprising:
 a data converting section for converting pager data being transmitted from said PHS base station having a PHS data format into pager data having a pager data format; and
 a display section for displaying said pager data converted into a pager data format at said data converting section.

4. A mobile communication system comprising:
 a pager electric field level monitor section for judging whether a pager receiving section is within a service area of a pager base station;
 a personal hand-held phone system (PHS) electric field level monitor section for judging whether a PHS receiving section is within a service area of a PHS base station;
 a control section for controlling one of a pager calling and a PHS calling by one of said pager base station and said PHS base station respectively, said control of said control section being implemented in accordance with a judging result by one of said pager electric field monitor section and said PHS electric field monitor section; and
 a control station for calling a mobile terminal equipment on receiving a calling request from the pager base station by utilizing said PHS base station when it is judged that said mobile terminal equipment is not located within said service area of said pager base station, and for converting pager data which is transmitted from said pager base station to said mobile terminal device into a data having a PHS data format, and for transmitting the converted pager data to said mobile terminal equipment.

5. A mobile communication system comprising:
 a pager electric field level monitor section for judging whether a pager receiver of a mobile terminal equipment is within a service area of a pager base station;
 a personal hand-held phone (PHS) electric field level monitor section for judging whether a PHS receiver of said mobile terminal equipment is within a service area of a PHS base station;
 a control section for controlling one of a pager calling and a PHS calling by either said pager base station and said PHS base station respectively, said control of said control section being implemented in accordance with a judging result by said pager electric field level monitor section and said PHS electric field level monitor section; and
 a control station for calling said mobile terminal equipment on receiving a calling request from said pager base station by utilizing said pager base station when it is judged that said mobile terminal equipment is located within the service area of said pager base station, and for transmitting the pager data to said mobile terminal equipment, and by utilizing said PHS base station when it is judged that said mobile terminal equipment is not located within the service area of said pager base station but within said PHS base station service area, wherein both PHS calling and pager calling may be implemented by the PHS calling station and the terminal equipment is able to convert the PHS data to a pager data format where said terminal equipment is outside said pager base station service area.

6. A mobile communication system comprising:
 a pager electric field level monitor section for judging whether a pager receiver of a mobile terminal equipment is within a service area of a pager base station;
 a personal hand-held phone system (PHS) electric field level monitor section for judging whether a PHS receiver of a mobile terminal equipment is within a service area of a PHS base station;
 a control section for controlling one of a pager calling and a PHS calling by one of said pager base station and said PHS base station respectively, said control of said control section being implemented in accordance with a judgement by one of said pager electric field monitor section and said PHS electric field monitor section; and
 a control station for transmitting a PHS calling request toward said mobile terminal equipment from said pager base station when a position registration of said mobile terminal equipment is not properly made to said PHS base station, and for changing the communication pattern so that a notice for the calling request from the PHS base station is dealt with by notifying said mobile terminal equipment of the PHS calling request along with data including terminal information of the caller through said pager base station, wherein both PHS calling and pager calling may be implemented by the PHS calling station and the terminal equipment is able to convert the PHS data to a pager data format where said terminal equipment is outside said pager base station service area.

7. A method of mobile communication in which a mobile terminal equipment is located within both a personal hand-held phone system (PHS) base station service area and a pager base station service area comprising the steps of:
 supplying power to a mobile terminal equipment at operation starting;
 carrying out a PHS calling notice and an ordinary pager calling from the pager base station;
 displaying that said mobile terminal equipment is located outside both said PHS base station service area and said pager service area;
 attempting synchronization with said PHS base station by said mobile terminal equipment in accordance with a PHS synchronizing signal being periodically transmitted from said PHS base station, said mobile terminal equipment maintaining a synchronization by periodically receiving a PHS synchronizing signal from said PHS base station, and said mobile terminal equipment arranges synchronization with a pager base station in accordance with a synchronizing signal periodically transmitted from said pager base station and said mobile terminal equipment maintaining the synchronization by periodically receiving a pager synchronizing signal from said pager base station;

monitoring an electric field strength of a PHS synchronizing signal being transmitted from said PHS base station at a PHS RSSI monitor section, when said mobile terminal equipment judges that a field strength is above a prescribed value which is set as a condition for data reception, it will inform said control section of such a state after which a PHS inner area flag is set;

monitoring an electric field strength of the pager synchronizing signal being transmitted from said pager base station, when said pager RSSI monitor section determines that an electric field strength of the pager synchronizing signal is above a prescribed value, said pager RSSI monitor section will inform such a condition to said control section, after which said pager inner area flag is set;

checking said PHS inner area flag, and if it is set, displaying at the display section that said mobile terminal equipment is located inside said PHS base station service area and clearing, after which is clears said PHS inner area flag;

checking said pager inner area flag and if it is set, informing said PHS base station that said mobile terminal equipment is located inside said pager base station service area;

forwarding information derived from said control section to said PHS base station through a PHS transmitter, a PHS duplexer and a PHS transceiver antenna by way of radio;

implementing an ordinary PHS calling from said PHS base station and an ordinary pager calling from said pager base station;

displaying at a display section that said mobile terminal equipment is located within said pager base station service area, wherein said mobile terminal equipment clears said pager inner area flag; and periodically monitoring operations on the electric field strength of the PHS synchronizing signal the electric field strength of the pager synchronizing signal until a change in the electric field strength is noted;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

8. A method of mobile communication in case where a mobile terminal equipment is located within a personal hand-held phone system (PHS) base station service area and is moved from inside a pager base station service area to outside the pager service area, comprising the steps of:

notifying that an electric field strength of a pager synchronizing signal is below a prescribed value at a pager RSSI monitor section, and when this is notified to a control section, a pager outer area flag is set;

notifying that a mobile terminal equipment is located outside a pager base station service area to a PHS base station by means of radio after confirming that a pager outer area flag is set;

changing a communication pattern to a pattern where an ordinary PHS calling from a PHS base station and a pager calling from the PHS station are carried out;

displaying at a display section that a mobile terminal equipment is located outside a pager base station service area after which it clears a pager outer area flag; and periodically monitoring operations on an electric field strength of a PHS synchronizing signal, and on the electric field strength of the pager synchronizing signal until there is a change in the state of the electric field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

9. A method of mobile communication wherein a mobile terminal equipment is located within a personal hand-held phone system (PHS) base station service area and moved from outside the pager base station service area to inside the pager service area, comprising the steps of:

notifying that an electric field strength of a pager synchronizing signal is judged by a pager RSSI monitor section to be above a predetermined value when an electric field strength of a pager synchronizing signal is monitored, notifying to a control section, after which a pager inner area flag is set;

confirming that said pager inner area flag is set;

informing a PHS base station by way of radio that said mobile terminal equipment is located within a pager base station terminal service area;

checking said PHS inner area flag to acknowledge if it is set, displaying at a display section that said mobile terminal equipment is located inside the PHS base station service area when the flag is set, after which it clears said PHS inner area flag;

checking said pager inner area flag to acknowledge if it is set, informing the PHS base station that said mobile terminal equipment is located inside the pager base station service area when the flag is set;

forwarding information derived from said control section and PHS area flags to the PHS base station through a PHS transmitter, a PHS duplexer and a PHS transceiver antenna by way of radio;

implementing an ordinary PHS calling from the PHS base station and an ordinary pager calling from the pager base station;

displaying at a display section that the mobile terminal is located within the pager base station service area, wherein said mobile terminal equipment will clear said pager inner area flag; and periodically monitoring operations on the electric field strength of the PHS synchronizing signal and the electric field strength of the pager synchronizing signal until a change in the electric field strength is noted;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

10. A method of mobile communication where a mobile terminal equipment is located within a pager base station service area and moved from the inside a personal hand-held phone system (PHS) base station service area to the outside of the PHS service area, comprising the steps of:

notifying that the electric field strength of a PHS synchronizing signal is confirmed as being below a prescribed value where the monitoring operation on an electric field strength of a PHS synchronizing signal is implemented, this state of the PHS synchronizing signal being then notified to a control section, after which a PHS outer area flag of the control section is set;

confirming that said PHS outer area flag is set, said mobile terminal equipment terminating a self ID data transmission to a PHS base station by virtue of the control section, and also stopping the self position registration to a PHS system, wherein the self ID data will not be transmitted from the mobile terminal, a control station determining one of that said mobile terminal equipment is switched off, and that said mobile terminal is located outside the PHS base station service area, so that the control station changes its communication pattern between itself and the mobile terminal equipment where a PHS calling notice as well as an ordinary pager calling from the pager base station are carried out by the pager base station;

monitoring electric field strength of the pager synchronizing signal by the pager RSSI monitor section;

displaying to the display section the fact that it is located outside the PHS base station service area and clearing the PHS outer flag of the control section; and periodically monitoring operations on the electric field strength of the PHS synchronizing signal and on the electric field strength of the pager synchronizing signal and until there is a change in the state of the field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

11. A method of mobile communication where a mobile terminal equipment is located within a pager base station service area and moved from an outside a personal hand-held phone system (PHS) base station service area to inside the PHS service area, comprising the steps of:

notifying that an electric field strength of a PHS synchronizing signal is above a prescribed value at a PHS RSSI monitor section while the monitoring section monitors an electric field strength of a PHS synchronizing signal;

informing a control section, that a PHS inner area flag of said control section is to be set;

confirming that said PHS inner area flag is set;

periodically transmitting a self ID data to a PHS base station by said control section, and also carrying out its self position registration to a PHS system;

determining that said mobile terminal equipment is located within a PHS base station service area because a self ID data from said mobile terminal equipment is received by said PHS base station and a position registration is completed;

changing a communication pattern between said mobile terminal equipment and itself where a normal PHS calling by the PHS base station and a normal pager calling by the pager base station are implemented;

checking the PHS inner area flag and confirming that it is set;

displaying at a display section that the mobile terminal equipment is located within the PHS base station service area, and clearing the PHS inner area flag; and periodically monitoring operations on the electric field strength of the PHS synchronizing signal, and on the electric field strength of the pager synchronizing signal until there is a change in the state of the electric field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

12. A method of mobile communication where a mobile terminal equipment is located outside both a personal hand-held phone system (PHS) base station service area and a pager base station service area, comprising the steps of:

notifying to a control section that an electric field strength of a PHS synchronizing signal is below a prescribed value at a PHS RSSI monitor section while it monitors an electric field strength of a, PHS synchronizing signal, and when this state of the PHS synchronizing signal is informed to a control section, setting a PHS outer area flag of the control section;

stopping transmission of a self ID data to a PHS base station by virtue of a control section, thereby terminating its self position registration to a PHS system; determining one of that a mobile terminal equipment is switched off, and that the mobile terminal equipment is located outside the PHS base station service area;

changing the PHS base station communication pattern between itself and said mobile terminal equipment to the one where a PHS calling notice as well as a normal pager calling from the pager base station are implemented;

monitoring an electric field strength of a pager synchronizing signal;

confirming that the electric field strength of the pager synchronizing signal is below the prescribed value;

informing such condition to the control section, upon which the pager outer area flag is set;

confirming that the PHS outer area flag and the pager outer area flag are set;

displaying at the display section that the mobile terminal equipment is located outside both the PHS base station service area and the pager base station service area and clearing the PHS outer area flag of the control section; and periodically monitoring operations on the electric field strength of the PHS synchronizing signal and the electric field strength of the pager synchronizing signal until there is a change in the state of the electric field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

13. A method of mobile communication where a mobile terminal equipment is located outside a pager base station service area and moved from outside of a personal hand-held phone system (PHS) base station service area to inside of the PHS service area, comprising the steps of:

notifying a control section that an electric field strength of a PHS synchronizing signal exceeds a prescribed value at a PHS RSSI monitor section, while it monitors an electric field strength of a PHS synchronizing signal when this state of the PHS synchronizing signal is informed to a control section, a PHS inner area flag of the control section is;

confirming that said PHS inner area flag is set, wherein said mobile terminal equipment periodically transmits a self ID data to the PHS base station by a control section, and carrying out its self position registration to a PHS system;

determining that said mobile terminal equipment is within the PHS base station service area;

changing a communication pattern between said mobile terminal equipment and itself where a normal PHS calling by the PHS base station and a normal pager calling by the pager base station are executed;

confirming that a pager outer area flag is set, and determining that the PHS base station is not yet informed that said mobile terminal equipment is located outside a pager base station service area, and informing that condition to the PHS base station by radio;

changing a communication pattern between the control station and the mobile terminal equipment to the one where a normal PHS calling and a pager calling by the PHS base station are carried out;

displaying at a display section that the mobile terminal equipment is located within the PHS base station service area and outside the pager base station service area;

clearing both a PHS inner area flag and a pager outer area flag of the control section; and periodically monitoring operations on the electric field strength of the PHS synchronizing signal, and on the electric field strength of the pager synchronizing signal until there is a change in the state of the electric field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

14. A method of mobile communication where a mobile terminal equipment is located outside a personal hand-held phone system (PHS) base station service area and is moved from outside a pager base station service area to inside of the pager service area, comprising the steps of:

notifying a control section that an electric field strength of a pager synchronizing signal is over a prescribed value at a RSSI monitor section, while it monitors an electric field strength of a pager synchronizing signal, when this state of a pager synchronizing signal is informed to a control section then a pager inner area flag of the control section is set;

confirming that the pager inner area flag is set, and displaying at a display section that the terminal equipment is inside the pager base station service area; and periodically monitoring operations on the electric field strength of the PHS synchronizing signal and on the electric field strength of the pager synchronizing signal until there is a change in the state of the field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

15. A method of mobile communication in case where a mobile terminal equipment is located outside a pager base station service area and is moved from inside a personal hand-held phone system (PHS) base station service area to outside the PHS service area, comprising the steps of:

notifying that an electric field strength of a PHS synchronizing signal denotes that it is below a prescribed value at a PHS RSSI monitor section while it monitors an electric field strength of the PHS synchronizing signal when this state of the PHS synchronizing signal is informed to the control section, a PHS outer area flag of the control section is set;

stopping transmitting a self ID data to a PHS base station by the control section, and terminating its self position registration to the PHS system;

determining that the mobile terminal equipment is being switched off, or that the mobile terminal equipment is located outside the PHS base station service area;

changing a communication pattern between the PHS base station and the mobile terminal equipment to one where a PHS calling notice as well as an ordinary pager calling from the pager base station are implemented;

displaying at a display section that the mobile terminal equipment is outside the PHS base station service area after which it clears the PHS outer area flag of the control section;

forwarding information derived from said control section to the PHS base station through a PHS transmitter, a PHS duplexer and a PHS transceiver antenna by way of radio;

implementing an ordinary PHS calling from the PHS base station and an ordinary pager calling from the pager base station;

displaying at a display section that the mobile terminal is located within the pager base station service area, then, said mobile terminal equipment will clear the pager inner area flag; and periodically monitoring operations on the electric field strength of the PHS synchronizing signal and the electric field strength of the pager synchronizing signal until a change in the electric field strength is noted;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

16. A method of mobile communication where a mobile terminal equipment is located outside a personal hand-held phone system (PHS) base station service area and is moved from inside a pager base station service area to outside of the pager service area, comprising the steps of:

notifying a control section that an electric field strength of a pager synchronizing signal denotes that it is below a prescribed value at a pager RSSI monitor section while it monitors an electric field strength of a pager synchronizing signal, and when this state of the pager synchronizing signal is informed to a control section, a pager outer area flag of the control section is set;

confirming the pager outer area flag is set, and displaying at the display section that it is located outside the pager base station service area;

displaying at the display section that the terminal is located outside both the PHS base station service area and the pager base station service area upon which it clears the PHS outer area flag of the control section; and periodically monitoring operations on the electric field strength of the PHS synchronizing signal and the electric field strength of the pager synchronizing signal until there is a change in the state of the electric field strength;

wherein both PHS calling and pager calling may be implemented by the PHS calling station and the terminal equipment is able to convert PHS data to a pager data format where said terminal equipment is outside said pager base station service area, and wherein both PHS calling and pager calling may be implemented by the pager calling station and the terminal equipment is able to convert pager data to a PHS data format where said terminal equipment is outside said PHS base station service area.

* * * * *

UNITED STATES PATENT AND TRADEMARK OFFICE
CERTIFICATE OF CORRECTION

PATENT NO.    : 6,134,436  
DATED         : October 17, 2000  
INVENTOR(S)   : K. Ezaki Page 1 of 1

It is certified that error appears in the above-identified patent and that said Letters Patent is hereby corrected as shown below:

Column 2,
Line 29: "arid" should read -- and --
Line 64: "communication system" should read -- communication method for utilization in a mobile communication system --

Column 6,
Line 26: Delete -- being --

Column 17,
Line 27, "clearing, after which is clears said" and should read -- clearing said --

Signed and Sealed this

Thirty-first Day of July, 2001

Attest:

NICHOLAS P. GODICI
Attesting Officer    Acting Director of the United States Patent and Trademark Office